RECORD CHANGER PACKAGE ASSEMBLY

Filed Aug. 20, 1968

Inventor:
Vernon A. Holmes
By Hofgren, Wegner, Allen, Stellman & McCord
Att'ys

United States Patent Office
3,506,114
Patented Apr. 14, 1970

3,506,114

RECORD CHANGER PACKAGE ASSEMBLY

Vernon A. Holmes, Harwood Heights, Ill., assignor to Warwick Electronics Inc., a corporation of Delaware Filed Aug. 20, 1968, Ser. No. 754,004
Int. Cl. B65d 85/30
U.S. Cl. 206—46 15 Claims

ABSTRACT OF THE DISCLOSURE

A record changer package assembly comprising a combination of a record changer and an overlay for protectively cushioning the movable and fragile portions of the record changer, as during shipment. The overlay defines a dust cover preventing foreign material from being disposed of the record changer mechanism during such shipment. The overlay is retained in position during such shipment by suitable associated means, such as the superjacent lid where the record changer is provided in a console, or a similar wall portion of the associated structure where the record changer is provided as a portion of a phonograph. The overlay comprises a formed one-piece plastic member. The overlay may be utilized as a conventional dust cover subsequent to installation of the record changer. The overlay may be further utilized to retain auxiliary equipment, such as adapters and removable spindles, in association with the record changer during shipment.

BACKGROUND OF THE INVENTION

Field of the invention

This invention relates to package assemblies and in particular to record changer package assemblies.

Description of the prior art

In modern packaging methods, preformed packaging elements have been provided to define recesses for holding a number of separate parts in association during shipment. Further, in certain known packaging structures, portions of the packaging have been formed to conform to the external configuration of the goods packaged therein, one example of this technique being the conventional skin-packaging.

In the shipment of relatively delicate equipment, such as record changers and the like, it has heretofore been necessary to secure the movable elements, such as the tone arm, overlay arm, tuntable, etc., against movement during shipment by a number of different securing means. Further, it has been necessary to provide protective enclosures for preventing dirt and dust from entering into the mechanism during such shipment. One method of preventing such dust and dirt entry has been to enclose the mechanism in a flexible wrapping. The packaging devices and methods have not proven completely satisfactory in that they are relatively time consuming and expensive.

SUMMARY OF THE INVENTION

The present invention comprehends an improved record changer package assembly eliminating the disadvantages of the above discussed packaging methods and providing a package assembly of extremely simple and economical construction. The invention comprehends such a record changer package assembly wherein an overlay member defines a dust cover not only for use during shipment, but which is also adaptable for replaceable use subsequently to assure long, trouble-free life of the record changer mechanism by protecting the mechanism against entry of dirt and dust. The overlay is further adapted to cushion the movable parts of the record changer while holding them in a desired disposition during shipment thereby to prevent damage to the parts, as by impact, vibration, pressure, and other displacement forces which may act on the package during such shipment.

The overlay member may be readily associated with the record changer for facilitated retention of a plurality of different movable portions thereof thereby effectively minimizing the cost of the package assembly. The overlay further is adapted to retain auxiliary equipment in association with the record changer which might otherwise become separated and lost.

More specifically, the invention comprehends a record changer package assembly comprising a record changer mounted on a base and including a motor board carried on the base, a turntable rotatably carried on the base, a tone arm movably carried on the base to swing over the turntable, a one-piece overlay having a top portion and a peripheral, depending wall portion adapted to be fitted over the motor board to provide a dust cover for the record changer, the overlay including means on the peripheral wall for embracing the motor board to retain the overlay in superposed relationship to the record changer, means on the top portion for retaining the tone arm in a preselected disposition against movement upwardly and laterally therefrom, and means retaining the overlay in fixed superposed relationship to the base.

Further, more specifically, the invention comprehends such a record changer package assembly wherein the overlay includes means for holding the overarm of the record changer. Further, the invention comprehends the provision of such an overlay having means for retaining the motor board against movement during shipment. Further, more specifically, the invention comprehends such an overlay having means for retaining the turntable against movement during shipment. Still further, the invention comprehends such a package assembly wherein the overlay defines means for retaining auxiliary equipment, such as adapters and removable spindles, in association with the record changer during shipment.

Further, more specifically, the invention comprehends the provision of such an overlay adapted for reuse to permit use thereof seriatim as a removable dust cover subsequent to shipment of the record changer.

BRIEF DESCRIPTION OF THE DRAWINGS

Other features and advantages of the invention will be apparent from the following description taken in connection with the accompanying drawings wherein.

DESCRIPTION OF THE PREFERRED EMBODIMENTS

Figures 2, 3:
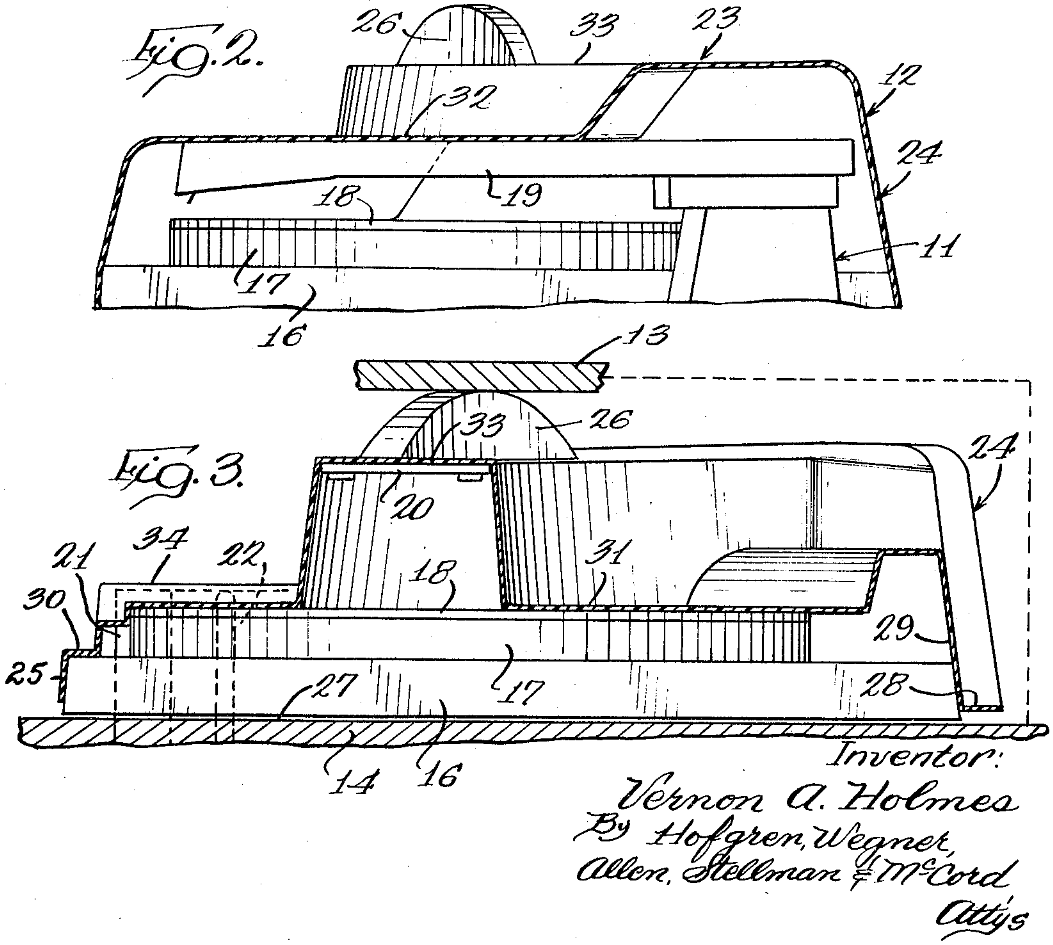
FIGURE 2 is a fragmentary vertical section thereof taken substantially along the line 2—2 of FIGURE 1.
FIGURE 3 is a vertical section thereof taken substantially along the line 3—3 of FIGURE 1.

In the exemplary embodiment of the invention as disclosed in the drawing, a record changer package assembly generally designated 10 is shown to comprise a record changer generally designated 11, an overlay generally designated 12, and an associated retaining means 13. Illustratively, the record changer 11 may comprise a portion of an associated structure, such as a stereo console or stereo phonograph, wherein retaining means are movably associated with the record changer to be removably superposed thereto. Thus, as shown in FIGURE 3, the retaining means 13 may comprise a wall member such as a portion of the lid of a stereo console which, in the closed position, is disposed superjacent the record changer 11. The record changer 11 is carried on a base 14 which may be fixed to the associated structure to dispose the record changer in a preselected disposition relative to the lid, in the conventional manner.

As discussed briefly above, in shipment of the discussed structure, it is necessary to hold the more delicate and fragile movable portions of the record changer mechanism to prevent damage thereto from shock forces and the like acting on the structure during shipment. Further, it is desirable to protect the mechanism from dirt and dust. The overlay member 12 effectively performs these necessary functions in a novel and simple manner. Thus, more specifically, the record changer 11 may further include a motor board 16 which is resiliently carried on the base 14 and by which the drive mechanism (not shown) is carried. A turntable 17 is disposed above the motor board 16 and may be provided with an overlying removable mat 18. The record changer 11 further includes a tone arm 19 and an overarm, or pressure arm, 20 which may be of conventional construction and each of which is mounted on the motor board 16 to be movable over the turntable 17 and which may have limited movement away from the turntable.

Auxiliary equipment may be provided in association with the record changer during shipment, herein illustratively comprising a 45 r.p.m. adapter 21 and a movable spindle 22. The adapter and spindle may be removably carried on the motor board 16.

The overlay member 12 comprises a one-piece structure which may be formed as by vacuum-forming of a suitable plastic such as styrene. Thus, illustratively, the overlay member may be transparent. The overlay member is preferably formed of a material having preselected resiliency for cushioning the movable elements of the record changer 11 while yet effectively positively retaining them substantially in the preselected shipping positions.

As best seen in FIGURES 2 and 3, the overlay member 12 includes a top portion, generally designated 23, and a peripheral depending wall portion 24. The wall portion includes a lowermost portion 25 which peripherally embraces the motor board 16 to retain the overlay relative to the base 14. The overlay 12 is retained in superposed position relative to the base by means of the overlying retaining member 13 which bears against an upstanding handle portion 26 of the top wall 23. The peripheral wall 24 includes an outturned flange portion 28 which overlies the top surface 27 of the base 14 as seen in FIGURE 3.

The overlay 12 further includes an inturned flange portion 30 which overlies a peripheral portion of the motor board 16 to retain it against movement away from the base.

The turntable 17 is retained against movement by a portion 31 of the top wall 23 which is urged against the mat 18 to retain the mat and turntable against rotation and movement away from the base.

Figure 1:
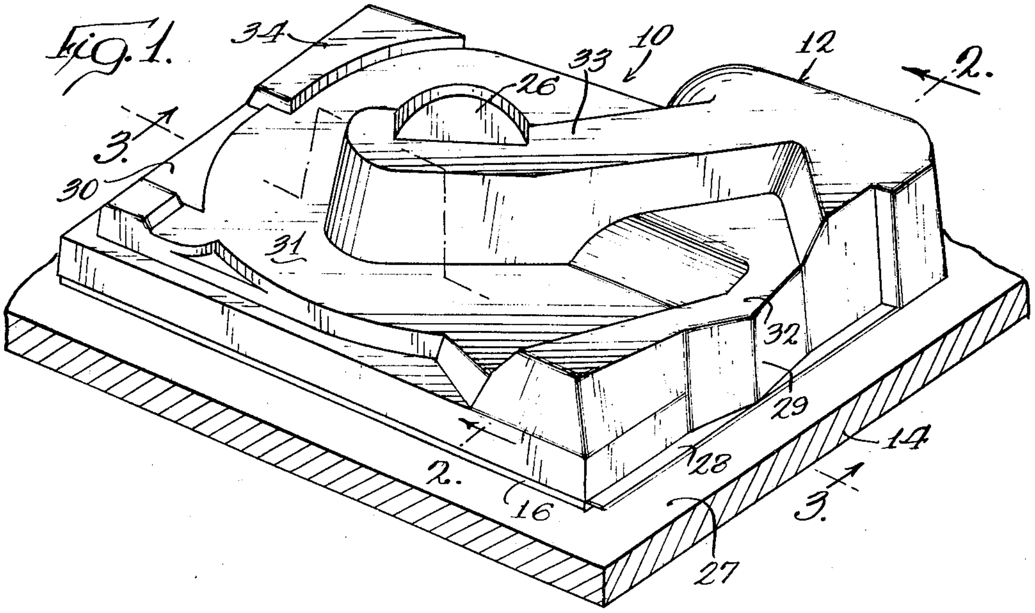
FIGURE 1 is a perspective view of a record changer package assembly embodying the invention.

As best seen in FIGURE 1, the top wall 23 further includes a formed portion 32 which receives the tone arm 19 to hold the tone arm against displacement from the preselected shipping position thereof illustrated in FIGURE 2. Still further, the top wall 23 includes a formed portion 33 which receives the overarm 20 and which holds the overarm against displacement from the preselected shipping position as shown in FIGURE 3.

The top wall 23 still further includes a top portion 34 which overlies the adapter 21 and removable spindle 22 carried by the base 14 so as to retain these auxiliary elements in the preselected shipping and storage position on the motor board. As the overlay comprises an impervious sheet member and engages the motor board 16 along the entire periphery thereof, the overlay effectively defines a dust cover preventing entry of dirt and dust into the record changer mechanism.

The overlay 12 may be made relatively thin and, therefore, relatively light by virtue of the irregular configuration thereof which provides self-reinforcement to direct the desirable holding forces to the different elements of the record changer. The projecting handle 26 serves not only to transfer the holding forces from the overlying wall member 13, but further provides for facilitated manipulation of the overlay when used subsequent to shipment as a dust cover.

As the single overlay member provides each of the discussed means for holding each of the above elements of the record changer and is effective to retain these several elements by the simple expedient of placement on the base as discussed above, facilitated packaging of the record changer for shipment and the like is obtained. Further, by virtue of the transparent nature of the overlay member, an opportunity to check the disposition of the record changer as packaged is provided for improved facilitated quality control. Further, by virtue of the one-piece construction of the overlay, the record changer may be quickly made available for use by the purchaser as all that need be done is remove the overlay thereby substantially immediately making the record changer mechanism available for normal use and obviating the laborious untying and unpackaging procedures required by the conventional holddown means.

Thus, the overlay 12 effectively defines a one-piece member adapted to retain movable members of a conventional record changer, such as the tone arm and overarm, during shipment and storage. The overlay member 12 further defines a protective cover for the record changer both during shipment and subsequently thereto, as desired.

While I have shown and described one embodiment of my invention, it is to be understood that it is capable of many modifications. Changes, therefore, in the construction and arrangement may be made without departing from the spirit and scope of the invention.

I claim:

1. A record changer package assembly comprising:
   - a record changer mounted on a base, including a motor board carried on said base, and a tone arm movably carried on said motor board;
   - a one-piece overlay having a top portion and a peripheral, depending wall portion adapted to be fitted over said record changer to provide a dust cover therefor, said overlay including means on said peripheral wall for embracing said motor board to retain said overlay against lateral movement relative to said record changer, and means on said top portion for retaining said tone arm in a preselected disposition against movement upwardly and laterally therefrom; and means retaining the overlay in fixed superposed relationship to said record changer.

2. The record changer package assembly of claim 1 wherein said record changer includes an overarm movably carried by said motor board to swing over said turntable and said overlay includes means on top said top portion for retaining said overarm in a preselected disposition.

3. The record changer package assembly of claim 1 wherein said overlay defines means for retaining said motor board against movement away from said base.

4. The record changer package assembly of claim 1 wherein said record changer further includes a turntable superjacent said base and said overlay top portion further includes means for retaining said turntable against rotation.

5. The record changer package assembly of claim 1 wherein said overlay top portion further includes means for retaining said turntable against movement away from said base.

6. The record changer package assembly of claim 1 wherein said record changer further includes a 45 r.p.m. adapter and said overlay further includes means for retaining said adapter in a preselected storage position in said record changer.

7. The record changer package assembly of claim 1 wherein said record changer further includes a removable spindle and said overlay further includes means for retaining said spindle in a preselected storage position in said record changer.

8. The record changer package assembly of claim 1 wherein said overlay comprises a formed sheet.

9. The record changer package assembly of claim 1 wherein said overlay comprises a plastic sheet.

10. The record changer package assembly of claim 1 wherein said overlay comprises a vacuum-formed plastic sheet.

11. The record changer package assembly of claim 1 wherein said overlay defines transparent means for facilitating inspection of the record changer in said package assembly.

12. The record changer package assembly of claim 1 wherein said overlay is adapted for post-sale removal and reinstallation whereby said overlay may be used as a shipping aid and subsequently as a protective dust cover.

13. A combination packaging aid and dust cover for use in combination with a record player assembly, said record player assembly being disposed within an enclosure and also including a component element adapted to be rotatably mounted and including a turntable, said combination packaging aid and dust cover comprising:

a one-piece overlay having top portion and depending skirt, said one-piece overlay being sized to cover at least said component and turntable to exclude dust therefrom, said one-piece overlay further having means engageable with said component to restrict the motion thereof, means on said top portion adapted to engage said enclosure and means on said skirt for engaging said rotatably mounted means whereby said record player assembly and one-piece overlay are cooperatively disposed with said enclosure to thereby restrict the motion of said rotatably mounted means.

14. The apparatus of claim 13 wherein said one-piece overlay is dimensioned relative to said record player assembly and said enclosure so as to be compressed therebetween when said one-piece overlay and the record player are cooperatively disposed within said enclosure.

15. The apparatus of claim 13 wherein said enclosure includes a lid movable between a closed and open position, said means on said top portion of said overlay being engaged by said lid when in said closed position.

References Cited

UNITED STATES PATENTS 2,709,032 5/1955 Robbins.
2,908,332 10/1959 Thurner ............ 206—45.34
2,959,357 11/1960 Morgan ............ 150—52
3,178,919 4/1965 Fradke.
3,321,071 5/1967 Webb.

WILLIAM T. DIXSON, JR., Primary Examiner

U.S. Cl. X.R.

150—52